United States Patent
Visvanathan et al.

(10) Patent No.: US 10,489,301 B1
(45) Date of Patent: Nov. 26, 2019

(54) METHOD AND SYSTEM FOR METADATA CHURN ABSORPTION

(71) Applicant: EMC IP Holding Company LLC, Hopkinton, MA (US)

(72) Inventors: Satish Visvanathan, San Jose, CA (US); Yamini Allu, Sunnyvale, CA (US); Rahul B. Ugale, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 102 days.

(21) Appl. No.: 15/483,955

(22) Filed: Apr. 10, 2017

(51) Int. Cl.
| | |
|---|---|
| *G06F 12/00* | (2006.01) |
| *G06F 13/00* | (2006.01) |
| *G06F 13/28* | (2006.01) |
| *G06F 12/0897* | (2016.01) |
| *G06F 12/0891* | (2016.01) |
| *G06F 11/14* | (2006.01) |

(52) U.S. Cl.
CPC ...... *G06F 12/0897* (2013.01); *G06F 12/0891* (2013.01); *G06F 11/1435* (2013.01); *G06F 2212/60* (2013.01)

(58) Field of Classification Search
CPC .......... G06F 12/0897; G06F 17/30997; G06F 11/1435
USPC ........................................................ 711/133
See application file for complete search history.

(56) References Cited

U.S. PATENT DOCUMENTS

| | | | |
|---|---|---|---|
| 2002/0078239 A1* | 6/2002 | Howard ............ | G06F 17/30094 709/245 |
| 2011/0099342 A1* | 4/2011 | Ozdemir ............. | G06F 11/2066 711/162 |
| 2012/0221828 A1* | 8/2012 | Fang .................... | G06F 3/0608 711/206 |

* cited by examiner

*Primary Examiner* — Edward J Dudek, Jr.
*Assistant Examiner* — Sidney Li
(74) *Attorney, Agent, or Firm* — Womble Bond Dickinson (US) LLP

(57) ABSTRACT

According to some embodiment, a backup storage system determines whether one or more data segments associated with a file object have been updated, where the data segment(s) are stored in a first segment level in a multi-level hierarchy. For each updated data segment, the system applies a reference-based hierarchical data structure to track metadata associated with the updated data segment, where the metadata is stored in a second segment level in the multi-level hierarchy. The system determines whether the reference-based hierarchical data structure has reached a specific size. The system writes the metadata associated with the updated data segment(s) to a solid state device (SSD) operating as a memory cache device responsive to determining that the reference-based hierarchical data structure has reached the specific size.

21 Claims, 7 Drawing Sheets

METHOD AND SYSTEM FOR METADATA CHURN ABSORPTION

FIELD OF THE INVENTION

Embodiments of the present invention relate generally to data storage systems. More particularly, embodiments of the invention relate to method and system for metadata churn absorption.

BACKGROUND

Though there are numerous media options, the classic storage hierarchy is often described as hard disk drives (HDDs) providing slow, persistent storage and dynamic random access memory (DRAM) situated closer to processors providing fast, volatile storage. Flash-based solid state devices (SSDs) became available with latency and price between DRAM and HDD, though with limited endurance.

Traditional computer architectures include primary storage systems and backup (data recovery) storage systems. Typically when a primary system fails, data from storage system is replicated to the primary system. While replicating, it may be desirable to simultaneously access data directly, i.e., random access, from the storage system. Because of long latency of accessing a storage system randomly, it is desirable to integrate SSDs as a caching layer in backup storage systems for improved performances.

A challenge is to build a backup storage system with a SSD cache layer balancing cost and performance. Because SSD has limited number write-erase cycles, another challenge is to limit write-erase cycles (churn) of the SSD cache to improve the useful life span of SSD devices.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
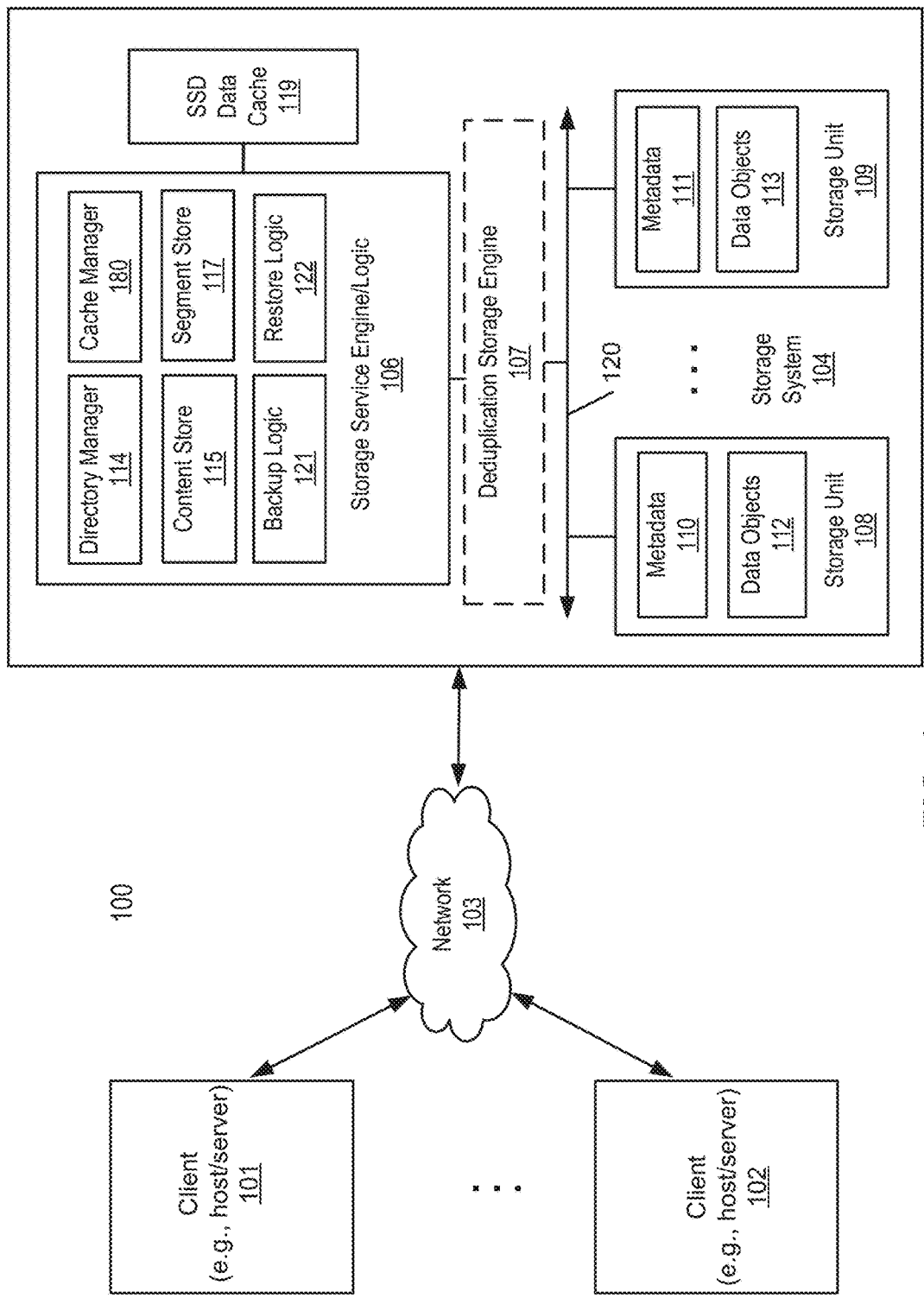
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

According to one aspect of the invention, a storage system may integrate solid state devices (SSD) as a caching layer for better random access performance in comparison with a storage system having only traditional spinning drives (e.g., traditional magnetic rotating disks). For example, SSDs can deliver about 500× more input/output operations per second (IOPS) than spinning drives but also have 5× the cost. SSDs, as well as other forms of flash memory, however, have a limited number of write-erase cycles after which a given region of memory cannot be rewritten. When data is accessed, the storage system determines whether one or more data segments associated with a file object have been updated, where the data segment(s) are stored in a first segment level in a multi-level hierarchy. For each updated data segment, the system applies a reference-based hierarchical data structure to track metadata associated with the updated data segment, where the metadata is stored in a second segment level in the multi-level hierarchy. The system determines whether the reference-based hierarchical data structure has reached a specific size. The system writes the metadata associated with the updated data segment(s) to a SSD operating as a memory cache device responsive to determining that the reference-based hierarchical data structure has reached the specific size.

According to another aspect of the invention, applying the reference-based hierarchical data structure to track metadata associated with the updated data segment comprises dynamically allocating one or more nodes within the reference-based hierarchical data structure, wherein each of the nodes stores a reference to a data region within the second segment level.

According to another aspect of the invention, writing the metadata associated with the updated data segment(s) to the SSD comprises performing only one read cycle and one write cycle on the SSD.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include directory manager 114, content store 115, segment store 117, optional backup logic 121, optional restore logic 122, and cache manager 180. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102). Directory manager 114 is configured to manage files stored in a file system of the storage system. Content store 115 may be configured to receive file segments requests from directory manager 114 and to retrieve the file segments from storage units 108-109 (via segment store 117) and/or SSD data cache 119. Segment store 117 may be configured to store and retrieve deduplicated segments to and from storage units 108-109. In another embodiment, segment store 117 includes deduplication storage engine 107 (not shown) and deduplicates file segments prior to storing the segments in storage units 108-109. Cache manager 180 is configured to manage access of a cache memory device, such as SSD device 119 operating as a cache memory device with respect to storage units 108-109.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication storage engine or deduplication logic 107 is configured to segment the data file into multiple segments (also referred to as chunks) according to a variety of segmentation policies or rules. Deduplication storage engine 107 may be implemented as part of content store 115 and/or segment store 117. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 2:
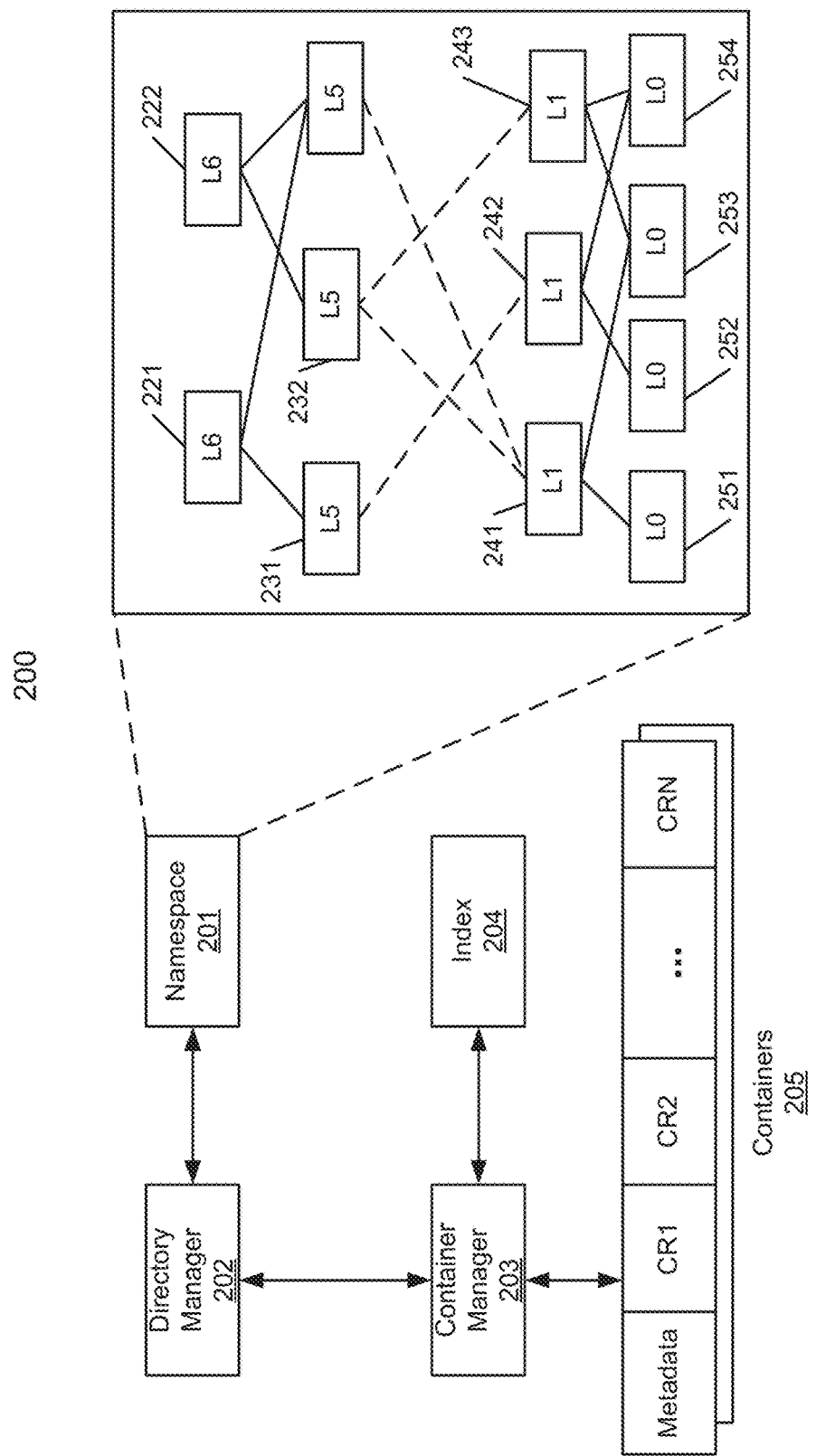
FIG. 2 is a block diagram illustrating an example of a Merkle tree file structure according to one embodiment of the invention.

FIG. 2 is a block diagram illustrating a storage system according to one embodiment of the invention. System 200 may be implemented as part of storage system 104 of FIG. 1. Referring to FIG. 2, system 200 traverses namespace 201 via directory manager 202, where directory manager 202 is configured to manage files stored in a file system of the storage system. In a deduplicated file system, a file may be represented in a file tree having one or more levels of segments in a multi-level hierarchy. In this example, there are seven levels L0 to L6, where L6 is the root level, also referred to as a top parent level. More or fewer levels may be applied herein. Each upper level contains one or more references to one or more lower level segments. In one embodiment, an upper level segment contains a fingerprint (e.g., metadata) of fingerprints of its child level segments. Only the lowest level segments (e.g., L0 segments) are the actual data segments containing the actual deduplicated segments. Thus, L1 to L6 are segments only contain metadata of their respective child segments(s), referred to herein as Lp segments.

In one embodiment, when system 200 traverses namespace 201 via directory manager 202, it obtains the fingerprints of the root level segments, in this example, L6 segments, as part of content handles from namespace 201. Based on the fingerprints of the current level segments, container manager 203 can identify which of the containers 205 in which the segments are stored based on indexing information from index 204. Index 204 may be maintained in the system memory (e.g., volatile memory) and/or in a storage device (e.g., non-volatile memory). Index 204 includes information mapping a fingerprint to a storage location that stores a segment represented by the fingerprint. In one embodiment, index 204 may be a fingerprint-to-container identifier (FP/CID) index that maps a particular fingerprint to a container that contains the corresponding segment or a compression region (CR) having the segment stored therein.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on. Throughout this application, for the purpose of illustration, a container contains one or more compression regions and each compression region contains one or more segments therein. However, the techniques may also be applied to other storage layouts.

Referring back to FIG. 2, in one embodiment, there are two components responsible to manage the files in the system. The first one is directory manager 202, which is a hierarchical mapping from the path to the inode representing a file. The second one is a content store, such as content store 115, which manages the content of the file. Each file has a content handle (CH) that is stored in the inode that is created by content store every time the file content changes. Each CH represents a file that is abstracted as a file tree (e.g., a Merkle tree or Mtree) of segments. In this example, a file tree can have up to 7 levels: L0, . . . , L6. The L0 segments represent user data (e.g., actual data) and are the leaves of the tree. The L6 is the root of the segment tree. Segments from L1 to L6 are referred to as metadata segments or Lp segments. They represent the metadata of the file. An L1 segment is an array of L0 references. Similarly an L2 is an array of L1 references and so on. A segment is considered live if it can be referenced by any live content in the file system.

The file system packs the segments into containers 205 which are written to a disk in a log-structured manner. The log-structured container set has a log tail and a log head. New containers are always appended at the head of the log. Each container is structured into sections. The first section is the metadata section and the following sections are compression regions. A compression region is a set of compressed segments. In the metadata section all the references or fingerprints that identify the segments in the container. The metadata further includes information identifying a content type, which describes the content of the container. For instance, it describes which compression algorithm has been used, which type of segments the container has (L0, . . . , L6), etc. Container manager 203 is responsible to maintain the log-structured container set and provide a mapping from container identifiers (CID) to block offset on disk. This mapping may be maintained in memory. It also contains additional information, e.g., the content type of each container.

In the example as shown in FIG. 2, segment 221 includes a fingerprint of fingerprints of segments 231 and 233, and segment 222 includes a representation (e.g., a fingerprint) of fingerprints of segments 232-233, and so on. Some of the segments, such as segment 233, are referenced shared by multiple parent level segments (e.g., segments 221-222). Thus, segments 221-222, 231-233, and 241-243 only contain data representing the metadata of their respective child segments. Only segments 251-254 contain the actual user data.

Figure 3:
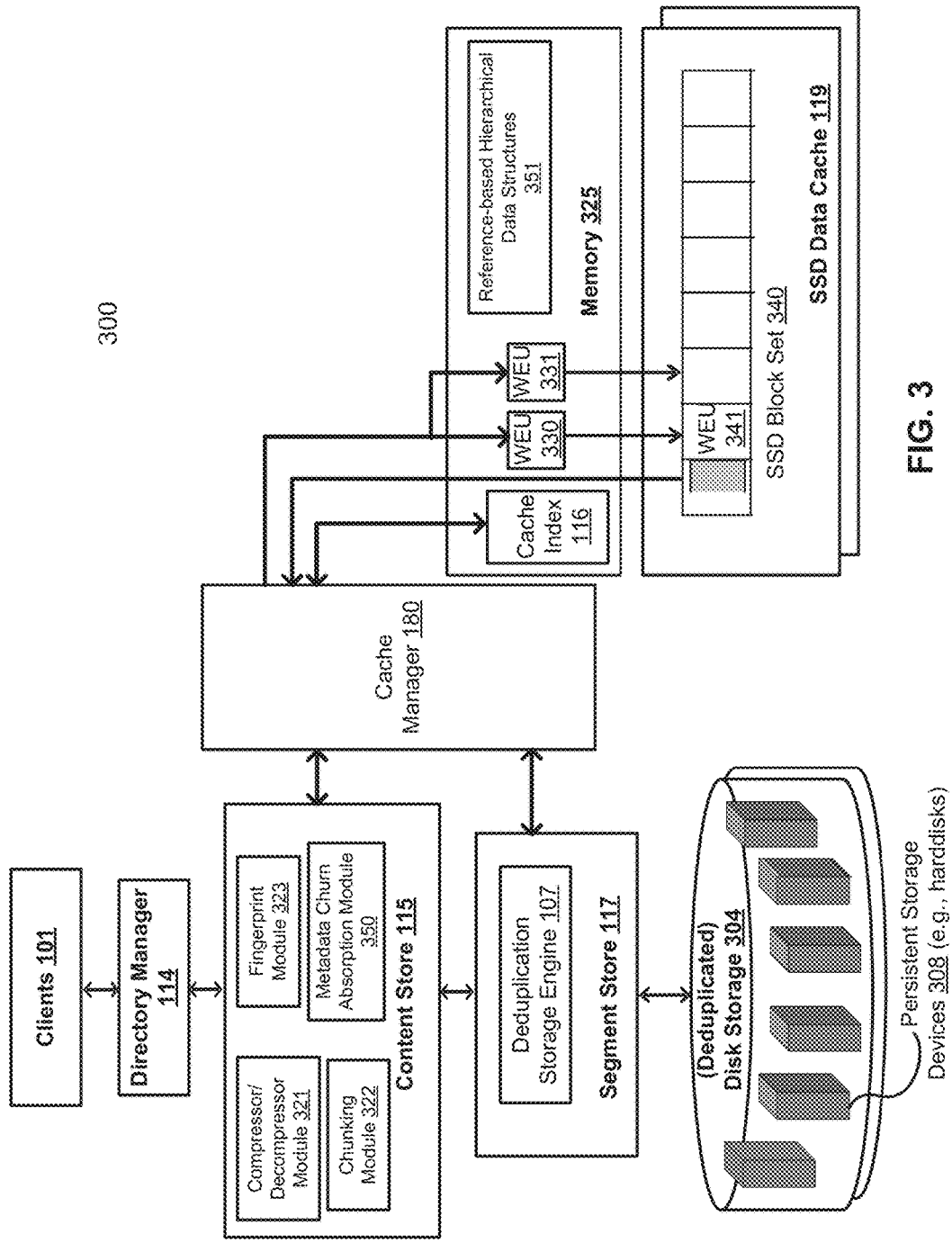
FIG. 3 is a block diagram illustrating example architecture of a storage system according to one embodiment of the invention.

FIG. 3 is a block diagram illustrating example architecture of a storage system according to one embodiment of the invention. System 300 may be implemented as a part of storage system 104 of FIG. 1. Referring to FIG. 3, storage system 300 includes, but is not limited to, one or more clients 101 communicatively coupled to directory manager 114 over a network (not shown). Directory manager 114 is communicatively coupled to content store 115. Directory manager 114 may be executed by a processor to provide a client interface to access files, via file handles, from the storage system. In addition, cache manager 180 is coupled to content store 115 and segment store 117 for accessing one or more SSD devices of SSD data cache 119.

At the bottom of FIG. 3 is disk storage 304 for storage of data. Disk storage 304 may be deduplicated and partitioned into containers (not shown). Each container may be made up of multiples of persistent storage devices 308, which may be implemented by spinning hard drives for a large capacity. Disk storage 304 may also contain file recipes, including file handles, fingerprints of data, and fingerprints of metadata such as nodes of a Merkle tree. Disk storage 304 may be one or more storage units 108-109 of storage system 104 of FIG. 1.

SSD data cache or cache 119 is a persistent cache memory device (such as a solid state device, SSD or flash memory), or simply referred to as cache, to accelerate performance. In cache 119, data are stored and evicted using a basic data structure referred to as a write-evict unit (WEU), such as WEU 341 of FIG. 3. WEU is a data unit that is written, erased, and/or evicted as a whole unit into and from SSD data cache 119. Content store 115 is configured to evict, via cache manager 180, WEUs no longer needed and free space to cache WEUs for new requests. The need of a WEU stems from the fact that cache 119 has limitations different from spinning hard disks, for example, a SSD storage unit must be explicitly erased before being overwritten, and the unit of erasure (up to MB(s) in size) is much larger than the unit of individual writes in disk storage (e.g., 4 kilobytes). In addition, writes wear out the SSD storage over time; therefore, less frequent write is more desirable. Here, a WEU unit may be configured to match a erasure unit of SSD devices of cache 119.

Furthermore, WEU as its basic data structure may be different from data structures such as chunks used in containers of the underlying disk storage 304. WEU is formed by multiple (and compressed) file extents or segments, which may be comprised of fixed-size blocks representing consecutive bytes (often many kilobytes) according to one embodiment of the invention. The consecutive bytes are within a single file in one embodiment. Extents may be the same as or different from file chunks depending on implementation. An extent may be an access unit size (the unit of read from the cache) that is performed by cache 119 in response to a request to access a file block of a file. A block (also referred to as a file block) is a data unit of each IO request to read or write to the underlying storage system. In this example, data requested by a higher file system layer (such as NFS) is in the form of block requests, which are converted to extent requests in the cache, while data being written in cache 119 is in a form of a WEU. A WEU, such as WEU 341, includes multiple extents, each of which is compressed therein where each extent can be independently read and accessed to satisfy read requests from the higher layers of the file system. The size of a WEU may be configured to match an erasure unit size of cache 119, which depends upon the specification or characteristics of cache 119. As a result, the lifespan of the cache 119 can be improved.

Memory 325 may be part of system memory of a storage system such as storage system 104 of FIG. 1. Memory 325 may be dynamic RAM (DRAM) or non-volatile RAM (NVRAM) or a combination thereof in one embodiment. Memory 325 contains cache index 116, which interacts with content store 115 (to index Merkle tree segments stored in cache 119 by storing portions of fingerprints of these segments in cache index 116) to accelerate reading from and writing data to cache 119. Cache index 116 interacts with WEUs 330-331 and WEU 341 for caching file extents in and evicting from cache 119 to accelerate system performance.

Segment store 117 may be part of storage service engine/logic of storage system 104, such as storage logic 106 of storage system 104 of FIG. 1. Segment store 117 may contain deduplication storage engine 107 in one embodiment. Segment store 117 interacts with content store 115 to store/retrieve data segments/chunks to/from disk storage 304. Segment store 117 may interact with memory 325 to store data segments that is retrieved from disk storage 304 to SSD data cache 119 for subsequent access.

Content store 115 may be part of storage service engine/logic of storage system 104, such as storage logic 106 of storage system 104 of FIG. 1. Content store 115 includes compressor/decompressor module 321, chunking module 322, fingerprint module 323, and metadata churn absorption module 350 in one embodiment. Content store 115 interacts with segment store 117, memory 325, cache 119, and directory manager 114 in one embodiment. For example, when data, such as a file, is read by a client, content store 115 receives a data segments read request via directory manager 114. Content store 115 may identify fingerprints associated with the file segments by traversing a file Merkle tree. In another embodiment, directory manager 114 traverses a file Merkle tree to identify the fingerprints. Content store 115 looks up cache index 116 from memory 325 to identify an index entry based on the fingerprints to obtain information about previously stored segments. An index entry may include information such as WEU identifier, physical offset, and content type L0/LP, associated with the physical location of the WEU storing the requested data segment. Content store 115 accesses cache 119 via cache manager 180 to retrieve a compressed data segment based on index entry information. Content store 115 extracts and decompresses the compressed data segment and returns the data segment to the client without accessing disk storage 304.

In one embodiment, in response to determining that a cache index entry does not exist in cache index 116, content store 115 looks up in a second index (not shown), such as index 204 of FIG. 2, based on the fingerprint of the requested data segment to identify a container ID identifying a container storing the requested data segment in disk storage 304 (i.e., one or more storage units 108-109 of FIG. 1). The second index may be stored in memory 325 or in disk storage 304. Content store 115 retrieves compressed data segment via segment store 117 from an identified container of a storage unit, decompresses, and returns the retrieved data segment to the client.

In addition, the retrieved decompressed data segment is further divided into segments for storage via chunking module 322. Compressor/decompressor module 321 of content store 115 compresses the segments and content store 115 stores them into one or more WEUs, such as WEUs 330-331. WEUs 330-331 are then cached via cache manager 180 into SSD data cache 119. Content store 115 subsequently updates cache index 116 by inserting a new entry in cache index 116 to map the fingerprint of the data segment to one or more WEU IDs (e.g., WEUs 330-331) of WEUs to be stored in SSD data cache 119.

In one embodiment, cache index 116 includes a number of index entries, each entry corresponds to one of a number of segments stored in cache 119. Each entry of cache index 116 contains a fingerprint of the underlying segment or a portion thereof, and at least the information to map the fingerprint to a physical storage location of a corresponding WEU in the SSD device, i.e., physical block or WEU ID, and a physical offset.

In one embodiment, index 204 of FIG. 2 includes a number of index entries, each entry mapping a fingerprint of a corresponding data segment to a container ID identifying a container of the storage unit storing the corresponding data segment, i.e., container ID of one or more containers of disk storage 304 storing a corresponding data segment. In one embodiment, cache 119 stores a number of WEUs, such as WEU 341, such that the WEUs are written, erased, and/or evicted as a whole unit into and from cache 119 altogether.

Metadata churn absorption module 350 serves to mitigate or absorb SSD churn of the SSD data cache 119. SSD churn refers to the number of unnecessary writes or write-erases of a SSD device over a specified time period, such that the data is almost never used. A write strategy may be employed when certain conditions are met, for example, when a sufficient number of L0 and/or Lp segments have been updated or overwritten. As previously discussed, in a multi-level hierarchy only the lowest level segments (e.g., L0 segments) contain the actual deduplicated data segments. The Lp segments (e.g., L1 to L6) are segments that contain only metadata of their respective child segments(s). The L0 and Lp segments may be packed into a container that is stored in disk storage 304.

To improve latency of accessing a storage system (e.g., storage system 300) randomly, SSDs are integrated as a caching layer, for example, by storing the Lp segments or copies of the Lp segments in the SSD data cache 319. However, as data segments (i.e., L0 segments) are modified or updated, corresponding Lp segments will also be modified or overwritten with updated metadata. Generally, not all modified Lp segments (e.g., L1 segments) are loaded or read, and as such, writing every modified Lp segments (e.g., to SSD data cache 119) is not useful. Moreover, this will cause churn of the SSD device as overwriting the Lp segments may require significant write-erase cycles, thereby decreasing the life span of the SSD.

To alleviate this issue, in some embodiments, metadata churn absorption module 350 may load L1 segments from disk storage 304 on a cache miss and populate them in SSD data cache 119. L1 segments generally have good locality. When a load of a L1 segment occurs, for example, a data region worth of L1 segments can be fetched from SSD data cache 119. Since the data region is already in a locality domain, it should provide decent efficiency. In some embodiments, when a file is opened or read for the first time, metadata churn absorption module 350 may prefetch all of the L1 segments, for example from SSD data cache 119, to increase the number of cache hits.

In some embodiments, Lp segments are not immediately written to the SSD for caching. Instead, the metadata churn absorption module 350 may write the Lp segments or copies of the Lp segments to the SSD (e.g., SSD data cache 319) when certain conditions are met. For example, the metadata churn absorption module 350 may create one or more reference-based hierarchical data structures 351 (e.g., binary tree, B-tree, B+ tree, heap) in memory 325 to keep track of changes or updates to L0 segments and corresponding Lp segments, which may be stored in a container such as containers 205 of FIG. 2. As changes are made to the L0 segments, for example, the metadata churn absorption module 350 may allocate nodes within the reference-based hierarchical data structure(s) 351 to store references to data regions of one or more corresponding Lp segments (e.g., L1 . . . L6 segments). When the reference-based hierarchical data structure(s) 351 reaches a specific or predetermined size (i.e., when there is sufficient number of updated L0 segments), the metadata churn absorption module 350 then commands writing the Lp segments to the SSD (e.g., SSD data cache 319). In this case, only one read cycle and one write cycle are required, thereby alleviating churn of the SSD. In some embodiments, the specific size is indicative when the hierarchical data structure is full.

Figure 4A:
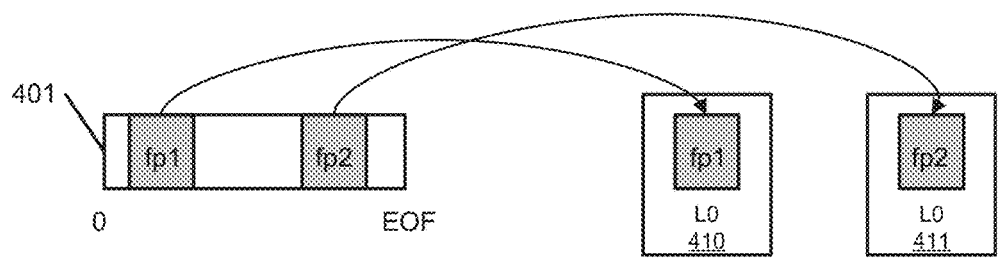
FIGS. 4A-4C are diagrams illustrating an example of in-memory churn absorption architecture according to one embodiment of the invention.
Figure 4B:
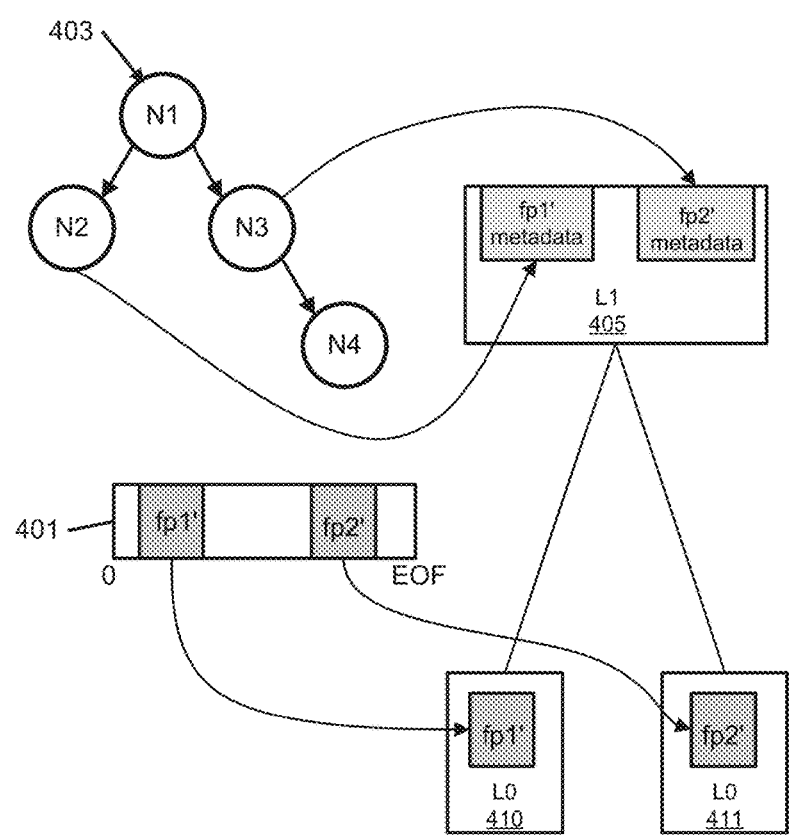
Figure 4C:
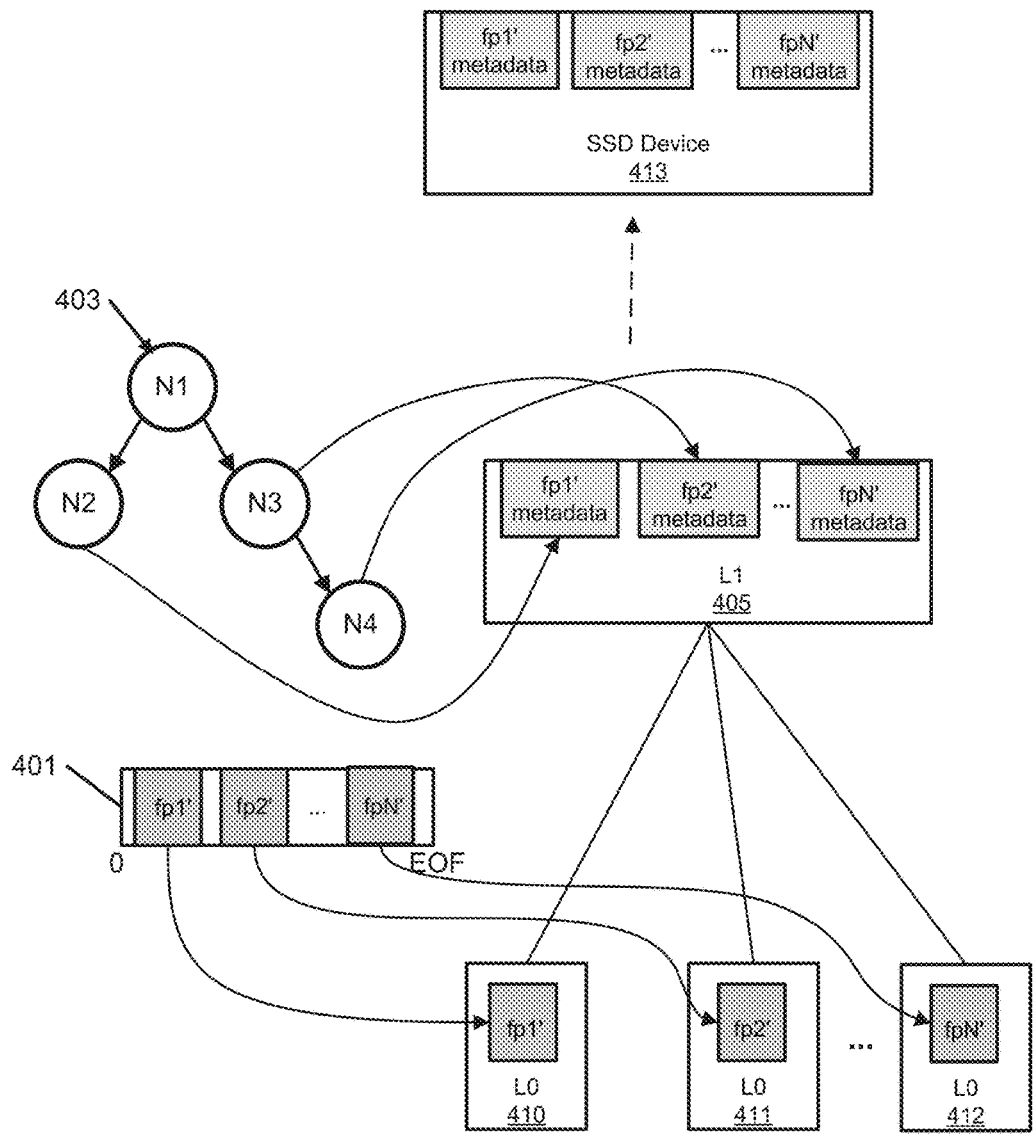

FIGS. 4A-4C are diagrams illustrating an example of in-memory churn absorption architecture according to one embodiment of the invention. Such in-memory churn absorption architecture may be implemented, for example, within the metadata churn absorption module 350 of FIG. 3.

Referring to FIG. 4A, file object 401 is divided or segmented into one or more data segments (e.g., fp1, fp2, etc.) and is represented in a file tree having one or more levels of segments in a multi-level hierarchy (e.g., L0 . . . L6). In FIG. 4A, the actual data (e.g., duplicated data segments) are stored in L0 segments 410 and 411. Referring to FIG. 4B, as the data segments in the file object 401 (i.e., L0 segments 410 and 411) are changed or modified (as indicated by fp1' and fp2'), the metadata corresponding to those segments in L1 segment 405 are also updated (as indicated by "fp1' metadata" and "fp2' metadata").

Reference-based hierarchical data structure 403 (e.g., binary tree, B-tree, B+ tree, heap) serves to keep track the updated corresponding metadata in L1 segment 405. For example, when the corresponding metadata in L1 segment 405 is updated, a node (e.g., root node N1, intermediate nodes N2 and N3, leaf node N4) is allocated (e.g., dynamic allocation) within the reference-based hierarchical data structure 403 to store a reference or offset to a data region within L1 segment 405 containing the updated corresponding metadata. In FIG. 4B, for example, intermediate node N2 contains a reference to fp1' metadata and intermediate node N3 contains a reference to fp2' metadata.

Referring to FIG. 4C, when the reference-based hierarchical data structure 403 reaches a specific size (i.e., when there is sufficient number of changed L0 segments such as L0 segments 410-412), updated corresponding metadata in L1 segment 405 are then stored in a SSD device 413. This way, a write-erase cycle is not performed on the SSD device 413 every time there is an update to any of L0 segments 410-412. Instead, a write-erase cycle is periodically performed on the SSD device 413, thereby reducing the churn of the SSD device 413. In some embodiments, root node N1 may store a reference to data region 24 MB-28 MB in L1 segment 405. In some embodiments, intermediate node N2 may store a reference to data region 4 MB-8 MB in L1 segment 405. In some embodiments, intermediate node N3 may store a reference to data region 44 MB-48 MB in L1 segment 405. In some embodiments, leaf node N4 may store a reference to data region 1 GB-(1 GB+4 MB) in L1 segment 405.

Figure 5:
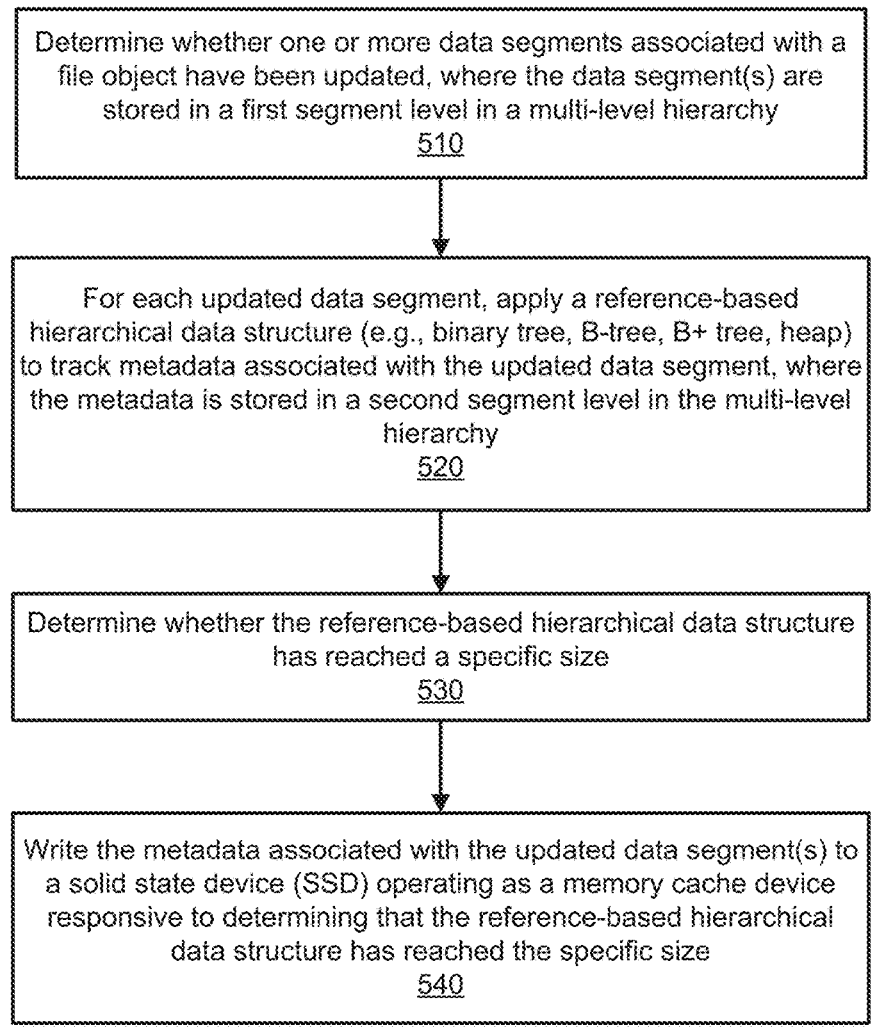
FIG. 5 is a flow diagram illustrating a method to absorb churn of the SSD according to one embodiment of the invention.

FIG. 5 is a flow diagram illustrating a method to absorb churn of the SSD according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by metadata churn absorption module 350 of FIG. 3. Referring to FIG. 5, at block 510, processing logic determines whether one or more data segments associated with a file object have been updated, where the data segment(s) are stored in a first segment level in a multi-level hierarchy. At block 520, the processing logic for each updated data segment, applies a reference-based hierarchical data structure (e.g., binary tree, B-tree, B+ tree, heap) to track metadata associated with the updated data segment, where the metadata is stored in a second segment level in the multi-level hierarchy. At block 530, the processing logic determines whether the reference-based hierarchical data structure has reached a specific size. At block 540, the processing logic writes the metadata associated with the updated data segment(s) to a solid state device (SSD) operating as a memory cache device responsive to determining that the reference-based hierarchical data structure has reached the specific size.

Note that some or all of the components as shown and described above (e.g., content store 115 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
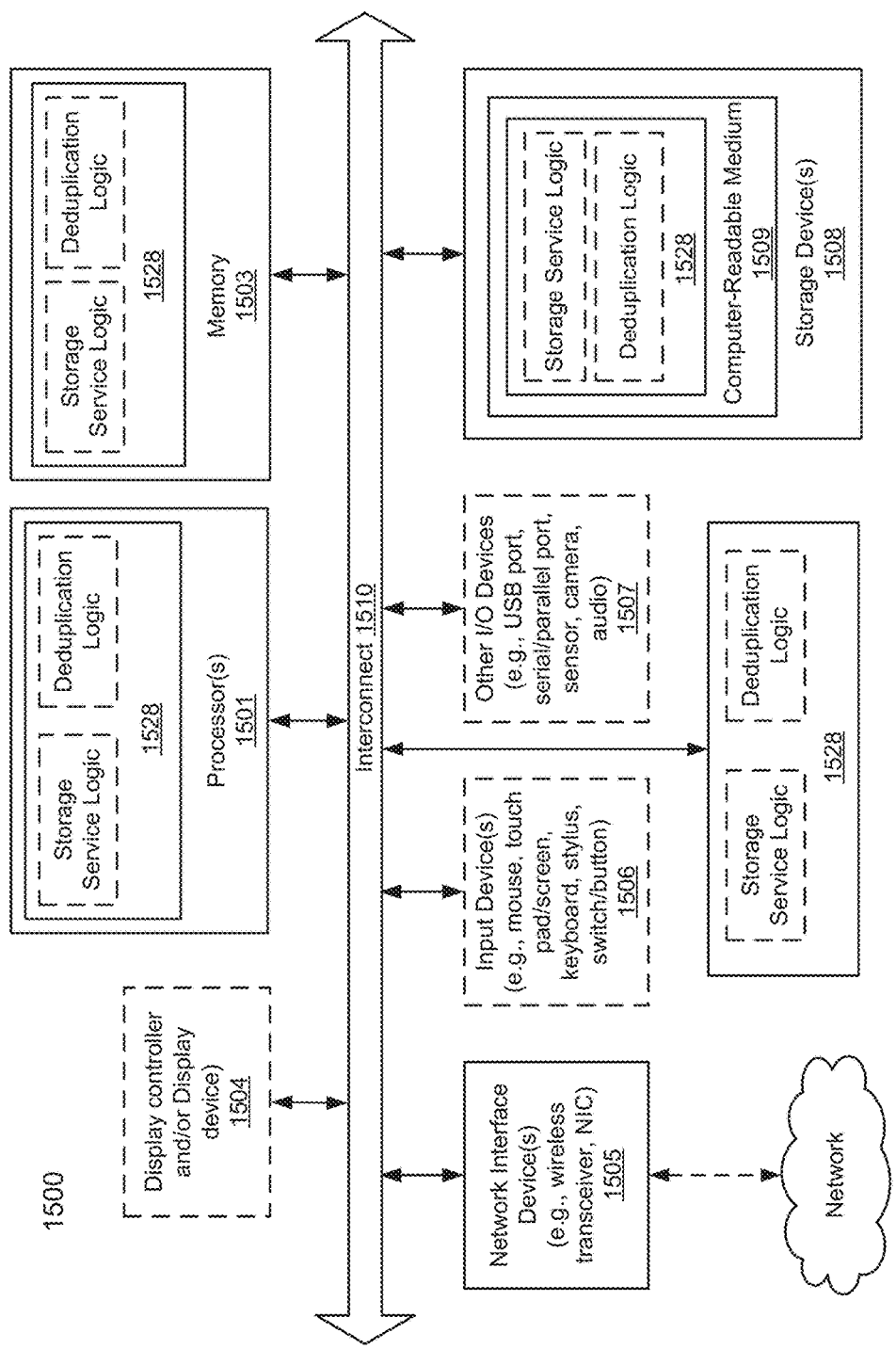
FIG. 6 is a block diagram illustrating a data processing system according to one embodiment.

FIG. 6 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for absorbing churn of a cache memory device, the method comprising:
   determining whether one or more data segments associated with a file object have been modified, wherein the data segment(s) are stored in a first segment level in a multi-level data structure;
   for each modified data segment,
      applying a reference-based hierarchical data structure to only track metadata associated with the modified data segment, wherein the metadata is stored in a second segment level in the multi-level data structure, the second segment level being a parent level segment to the first segment level in the multi-level data structure;
      determining whether the reference-based hierarchical data structure has reached a specific size; and
      writing the metadata associated with the modified data segment(s) to a solid state device (SSD) operating as a memory cache device responsive to determining that the reference-based hierarchical data structure has reached the specific size.

2. The method of claim 1, wherein applying the reference-based hierarchical data structure to track metadata associated with the modified data segment comprises dynamically allocating one or more nodes within the reference-based hierarchical data structure, wherein each of the nodes stores a reference to a data region within the second segment level.

3. The method of claim 1, wherein writing the metadata associated with the modified data segment(s) to the SSD comprises writing the metadata in a first of a plurality of write-evict units (WEUs) stored in the SSD.

4. The method of claim 1, wherein the specific size is indicative that the reference-based hierarchical data structure is full.

5. The method of claim 1, wherein the reference-based hierarchical data structure is a binary tree, B-tree, B+ tree, or heap.

6. The method of claim 2, wherein the one or more nodes include a root node, one or more intermediate nodes, and one or more leaf nodes.

7. The method of claim 1, wherein writing the metadata associated with the modified data segment(s) to the SSD comprises performing only one read cycle and one write cycle on the SSD.

8. A non-transitory machine-readable medium having instructions stored therein, which when executed by a processor, cause the processor to perform operations to absorb churn of a cache memory device, the operations comprising:
   determining whether one or more data segments associated with a file object have been modified, wherein the data segment(s) are stored in a first segment level in a multi-level data structure;
   for each modified data segment,
      applying a reference-based hierarchical data structure to only track metadata associated with the modified data segment, wherein the metadata is stored in a second segment level in the multi-level data structure, the second segment level being a parent level segment to the first segment level in the multi-level data structure;
      determining whether the reference-based hierarchical data structure has reached a specific size; and writing the metadata associated with the modified data segment(s) to a solid state device (SSD) operating as a memory cache device responsive to determining that the reference-based hierarchical data structure has reached the specific size.

9. The non-transitory machine-readable medium of claim 8, wherein applying the reference-based hierarchical data structure to track metadata associated with the modified data segment comprises dynamically allocating one or more nodes within the reference-based hierarchical data structure, wherein each of the nodes stores a reference to a data region within the second segment level.

10. The non-transitory machine-readable medium of claim 8, wherein writing the metadata associated with the modified data segment(s) to the SSD comprises writing the metadata in a first of a plurality of write-evict units (WEUs) stored in the SSD.

11. The non-transitory machine-readable medium of claim 8, wherein the specific size is indicative that the reference-based hierarchical data structure is full.

12. The non-transitory machine-readable medium of claim 8, wherein the reference-based hierarchical data structure is a binary tree, B-tree, B+ tree, or heap.

13. The non-transitory machine-readable medium of claim 9, wherein the one or more nodes include a root node, one or more intermediate nodes, and one or more leaf nodes.

14. The non-transitory machine-readable medium of claim 8, wherein writing the metadata associated with the modified data segment(s) to the SSD comprises performing only one read cycle and one write cycle on the SSD.

15. A data processing system, comprising:
a processor; and
a memory coupled to the processor to store instructions, which when executed by the processor, cause the processor to perform operations, the operations including:
determining whether one or more data segments associated with a file object have been modified, wherein the data segment(s) are stored in a first segment level in a multi-level data structure;
for each modified data segment,
applying a reference-based hierarchical data structure to only track metadata associated with the modified data segment, wherein the metadata is stored in a second segment level in the multi-level data structure, the second segment level being a parent level segment to the first segment level in the multi-level data structure;
determining whether the reference-based hierarchical data structure has reached a specific size; and
writing the metadata associated with the modified data segment(s) to a solid state device (SSD) operating as a memory cache device responsive to determining that the reference-based hierarchical data structure has reached the specific size.

16. The data processing system of claim 15, wherein applying the reference-based hierarchical data structure to track metadata associated with the modified data segment comprises dynamically allocating one or more nodes within the reference-based hierarchical data structure, wherein each of the nodes stores a reference to a data region within the second segment level.

17. The data processing system of claim 15, wherein writing the metadata associated with the modified data segment(s) to the SSD comprises writing the metadata in a first of a plurality of write-evict units (WEUs) stored in the SSD.

18. The data processing system of claim 15, wherein the specific size is indicative that the reference-based hierarchical data structure is full.

19. The data processing system of claim 15, wherein the reference-based hierarchical data structure is a binary tree, B-tree, B+ tree, or heap.

20. The data processing system of claim 16, wherein the one or more nodes include a root node, one or more intermediate nodes, and one or more leaf nodes.

21. The data processing system of claim 15, wherein writing the metadata associated with the modified data segment(s) to the SSD comprises performing only one read cycle and one write cycle on the SSD.

* * * * *